READ-WRITE AMPLIFIER SYSTEM
Filed March 23, 1955
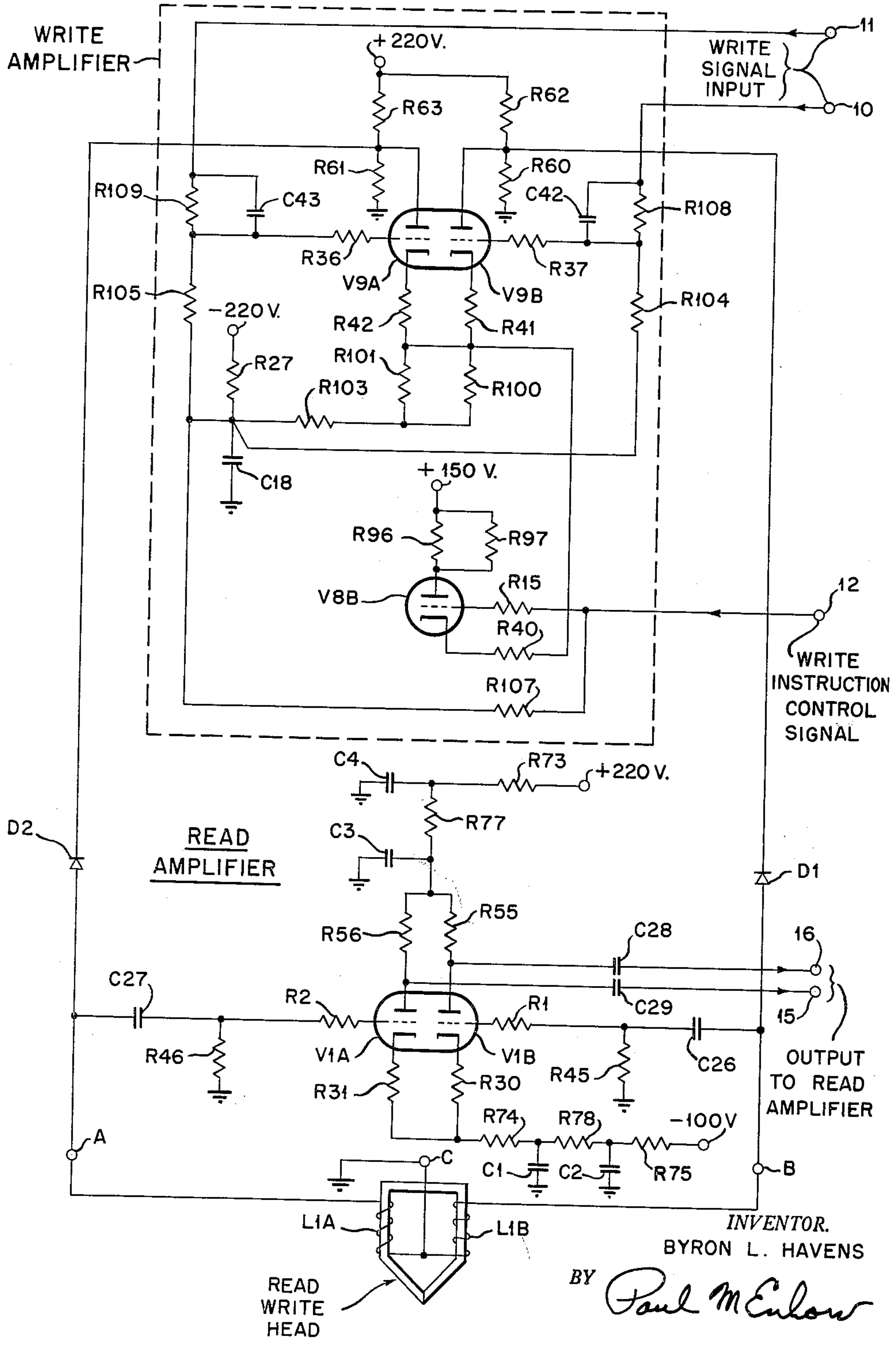
INVENTOR.
BYRON L. HAVENS
BY Paul McEnlow
AGENT

United States Patent Office 2,978,686

Patented Apr. 4, 1961

2,978,686

READ-WRITE AMPLIFIER SYSTEM

Byron L. Havens, Closter, N.J., assignor to International Business Machines Corporation, New York, N.Y., a corporation of New York Filed Mar. 23, 1955, Ser. No. 496,245

6 Claims. (Cl. 340—174.1)

This invention relates to electronic circuits and has particular relation to novel isolation and coupling circuits used to connect two amplifiers to a common impedance.

In particular applications, it is necessary to couple the output stage of a high-level amplifier and the input stage of a low-level amplifier to a common impedance such as a magnetic transducer. Trouble is frequently experienced with spurious signals feeding through the output stage of the high-level amplifier to the common impedance during time intervals in which the tubes of the output stage are cut off. If the low-level amplifier is being used during this time to amplify signals induced in the transducer, the spurious signals fed through the output stage of the high-level amplifier constitute interference signals. These spurious signals may be picked up by the output tubes of the high-level amplifier from associated circuitry or the signals may be coupled through the grid-to-plate capacitance of these output tubes to the common impedance and thence to the input stage of the low-level amplifier.

Accordingly, it is an object of this invention to provide novel means for substantially eliminating spurious noise signals present at the output stage of the high-level amplifier which may be applied to a subsequent amplifying stage.

Another object is to provide a novel read-write amplifier system wherein spurious signals from the writing means are isolated by switching means from the reading means during a reading operation.

Another object is to provide novel coupling means between input tubes of one amplifier which bridges the output tubes of a non-conductive amplifier.

Another object is to provide a novel isolation and coupling circuit whereby undesired noise signals are substantially isolated from a low impedance and desired signals are coupled to said low impedance.

A still further object is to provide the novel means for coupling an active amplifier and an inactive amplifier to a common impedance whereby spurious noise signals present in the inactive amplifier are substantially isolated from said impedance when the remaining amplifier is active.

A still further object is to provide circuit means which present a high impedance to spurious signals and a low impedance to desired pulse signals so as to permit the use of a single transducer with a write amplifier and also with a read amplifier.

Other objects and advantages of the invention will be pointed out in the following description and claims and illustrated in the accompanying drawing which discloses by way of example the principle of the invention and the best mode which has been contemplated of applying that principle.

In the drawing:

The single figure is a schematic circuit diagram illustrating the connection of the output stages of a write amplifier and the input stage of a read amplifier to a common read-write transducer as used in a magnetic recording system.

It is well known in the magnetic recording art that a single magnetic transducer can be utilized both for writing information on a magnetic surface, and, at a later time, used to read information which was previously written on the magnetic surface. Accordingly, this requires that the output stage of the write amplifier and the input stage of the read amplifier must be bridged and also coupled to a single transducer.

One method of writing information on a magnetic surface is to cause the magnetic polarization of the surface to be reversed so as to cause a "bit" of information to be written. A "bit" of information is used herein to refer to the writing of an electrical signal or pulse on the magnetic surface which may be read from the surface and manifested as an electrical signal at a later time. The write amplifier in conjunction with the transducer is used to record bits of information, whereas such bits previously recorded are sensed through use of the transducer in conjunction with the read amplifier.

Referring to the drawing, signals representing bits of information to be written on the magnetic surface are applied to input terminals 10 and 11 which would normally be connected to the output of the previous stage of the write amplifier. The signals applied to these terminals are always of opposite relative polarity. That is, when terminal 10 is Up, terminal 11 is Down and vice-versa. A bit of information to be written is represented by a reversal of the polarity of terminals 10 and 11. For example, if terminals 10 and 11 are initially Down and Up, respectively, and thereafter are altered to Up and Down, respectively, the polarity reversal indicates that a bit is to be written. The potentials of these terminals will then remain in the latter state until another bit is to be written whereupon a further polarity reversal must occur. It is of no importance whether terminals 10 and 11 are respectively Up and Down or vice-versa. The important factor is that a bit of information to be written is manifested by a polarity reversal of these terminals.

Terminal 10 is connected through resistor R108 and capacitor C42 connected in parallel and through resistor R37 to the control grid of tube V9B. Terminal 11 is connected through resistor R109 and capacitor C43 in parallel and through resistor R36 to the control grid of tube V9A. The control grids of tubes V9A and V9B are respectively connected through resistor R36 and R105, and R37 and R104, to the juncture of resistors R103 and R27. The cathodes of these tubes are respectively connected through resistors R42 and R41 to the upper juncture of resistors R101 and R100. The opposite ends of resistors R101 and R100 are connected together and through resistors R103 and R27 in series to the −220 volt terminal.

A Write Instruction Control Signal is applied to control terminal 12. The purpose of this signal is to indicate to the write amplifier (tubes V9A and V9B) that the information appearing on terminals 10 and 11 is to be written on the magnetic surface. Terminal 12 is connected through R15 to the control grid of tube V8B and also through resistor R107 to the juncture of R103 and R27. The cathode of tube V8B is connected through parasitic suppressing resistor R40 to the juncture R42, R101, R41 and R100. The anode of tube V8B is connected through R96 and R97 in parallel to the +150 volt terminal.

When a Write Instruction Control Signal is not being applied to terminal 12, the terminal is Up and tube V8B is rendered conductive so as to draw current therethrough and through resistors R40, R101, R100, R103 and R27. Consequently, the juncture of resistors R40, R101 and R100 is raised to a sufficiently high potential so as to cause tubes V9A and V9B to be cut off. When these tubes are cut off, the signals applied to terminals 10 and 11 do not effect the write amplifier.

However, when the Write Instruction Control Signal is present, terminal 12 is Down and tube V8B is cut off. Thus when terminal 12 is Down, this tube cannot effect the potentials of the cathode circuit of the write amplifier tubes V9A and V9B. That is, tube V8B conditions the write amplifier so that it may function to write bits of information. When the tubes V9A and V9B are so conditioned terminals 10 and 11 may, for example, be respectively Up and Down so as to cause tube V9B to be conductive and tube V9A to be non-conductive.

The anode of tube V9A is connected to the juncture of resistors R63 and R61 and also to the cathode of diode rectifier D2. Resistors R63 and R61 serve as a voltage divider connected between the +220 volt terminal and ground so as to maintain the anode of V9A and thus the cathode of D2 at approximately +7 volts whenever tube V9A is cut off. Similarly, the anode of V9B is connected to the juncture of resistors R62 and R60 and also to the cathode of diode D1. Here again R62 and R60 are connected in series between +220 volts and ground so as to maintain the anode of tube V9B at approximately +7 volts whenever this tube is non-conductive. The anodes of diodes D2 and D1 are respectively connected to the A and B end terminals of the coils L1A and L1B of the read-write head. The common juncture C of coils L1A and L1B is connected to ground. L1A and L1B may be referred to as a single winding having a common center tap C.

Consider for example that terminals 10 and 11 are respectively Up and Down so that tubes V9B and V9A are respectively conductive and non-conductive. This causes current to flow from ground through coil L1B of the read-write head, through diode D1, tube V9B, and through the cathode resistances to the −220 volt terminal. The fact that current flows through coil L1B of the read-write head causes the magnetic flux associated with the head to polarize the surface beneath the head.

The fact that a bit of information is to be written on the magnetic surface is manifested by a reversal of the previously assumed polarity of terminals 10 and 11. Accordingly, the reversal causes terminals 10 and 11 to be respectively Down and Up whereupon tubes V9B and V9A are respectively rendered non-conductive and conductive. Since V9A is now conductive, current will flow from ground through coil L1A of the read-write head through diode D2, tube V9A and the cathode resistances associated therewith to the −220 volt terminal. Since current is now flowing through coil L1A rather than L1B, the magnetic surface is polarized in the opposite direction.

To summarize briefly, when a Write Instruction Control Signal is present terminal 12 is Down and, in the absence of an instruction to write a bit, current flows steadily through either coil L1A or L1B so that the magnetic recording surface is polarized in a given direction. Each time that a bit of information is to be written, the signals applied to terminals 10 and 11 are reversed thereby causing current to flow through the opposite coil which causes the polarization of the magnetic surface immediately beneath the head to be reversed. It will be noted hereinafter that the reversal of the magnetic polarization of the recording surface is sensed as a bit of information, whereas the absence of polarization reversals is sensed as the absence of information present on the recording medium.

During time intervals in which information is to be read from the recording medium, the write amplifier tubes V9A and V9B are disabled as indicated above by the absence of the Write Instruction Control Signal which causes terminal 12 to be Up. As the read-write head senses a reversal in magnetic polarization, a signal is induced in the read-write head and is applied to the input tubes V1A and V1B of the read amplifier.

Terminal A of the read-write head is connected through capacitor C27 and resistor R2 in series to the control grid of tube V1A and terminal B is connected through C26 and R1 in series to the control grid of tube V1B. The cathodes of V1A and V1B are respectively connected through resistors R31 and R30 to one terminal of resistor R74. The opposite terminal of R74 is connected through R78 and R75 in series to the −100 volt terminal. Bypass capacitors C1 and C2 are respectively connected between the junctures of R74 and R78, and R78 and R75 and ground. The anodes of V1A and V1B are respectively connected through resistors R56 and R55 to the juncture of R77 and C3. This juncture is connected through resistors R77 and R73 in series to the +220 volt terminal. The juncture R73 and R77 is connected through bypass capacitor C4 to ground. The network comprising R73, R77, C4 and C3 constitutes a filter circuit used to isolate transient signals present on the +220 volt terminal from the read amplifier. The anodes of V1A and V1B are respectively coupled by capacitors C29 and C28 to output terminals 15 and 16, respectively, which may be connected to a subsequent amplifying stage of the read amplifier.

Thus when signals are induced in the read-write head as a result of the sensing of a magnetic polarization reversal, these signals are amplified by tubes V1A and V1B operating in "push-pull" and delivered via terminals 15 and 16 to subsequent stages of the read amplifier.

As stated above, during time intervals when information is being read from the recording medium the output tubes V9A and V9B of the write amplifier are cut off. The novel circuit arrangement wherein diodes D1 and D2 act as logical switches substantially eliminates the undesirable effects of unwanted signals.

Spurious noise signals or transient signals which may be coupled through the grid-to-plate capacitance of either of the write output tubes V9A and V9B will be applied to the cathodes of diodes D1 and D2. However, when the cathodes of these diodes are held at approximately +7 volts by the voltage dividers R63, R61 and R62, R60 (whenever the write output tubes are cut off) the diodes are non-conductive since terminals A and B of the read-write head are essentially at ground potential. Since the impedance of either L1A or L1B of the read-write head is very small compared to the back resistance of either of the diodes D1 or D2, the noise signals applied to the cathodes of these diodes will be dissipated across the back resistance of the diodes; that is, the impedance between the anode of either V9A or V9B and ground is the back resistance of the diode in series with the low D.C. resistance of either L1A or L1B. The shunt capacity of the diodes is sufficiently low so that there is no A.C. coupling between the anodes of the write amplifier tubes and the control grids of the read amplifier tubes. The back resistance of the diode is normally in the range 60,000 to 200,000 ohms, whereas the resistance of the write head is normally in the range 10 to 30 ohms. Therefore, the diode cascaded with the impedance of the write head acts as a voltage divider network whereby the greater portion of the unwanted spurious signals are developed across the back resistance of the diode and hence will not substantially effect the read-write head. In effect then, the spurious unwanted signals are isolated from the read amplifier tubes V1A and V1B by the impedance of the diodes. The diodes serve as non-linear impedance devices which exhibit a relatively high impedance when the write output tubes V9A and V9B are both non-conductive, but exhibit a relatively low impedance when the associated output tube is conductive. That is, the diodes act as a switch between the write amplifier and the read-write head.

While there have been shown and described and pointed out the fundamental novel features of the invention as applied to a preferred embodiment, it will be understood that various omissions and substitutions and changes in the form and details of the device illustrated and in its operation may be made by those skilled in the art, wtihout departing from the spirit of the invention. It is the intention, therefore, to be limited only as indicated by the scope of the following claims.

What is claimed is:

1. A bridging circuit for substantially isolating spurious signals present at the output of a first amplifier from the input of a second amplifier, including; a first grid controlled tube; means connected to said first tube and responsive to a control voltage to condition said first tube; means connected to the control grid of said first tube to alternately render said tube conductive and non-conductive; rectifier means connected to said tube whereby said rectifier offers its lower resistance to current flow towards the anode of said first tube; a magnetic tranducer connected to said rectifier and capable of manifesting information signals read from and to be recorded on a magnetic medium; voltage divided means connected to said first tube to permit the anode thereof to attain first and second potentials when said tube is respectively conductive and non-conductive whereupon said rectifier is respectively rendered conductive and non-conductive; and, a grid controlled second tube coupled to said transducer and said rectifier so that spurious signals at said anode are isolated from said second tube and said transducer whereas information signals read from a magnetic medium are applied to the control grid of said second tube.

2. A circuit for substantially isolating spurious signals present at the output of one amplifier stage from the input of another amplier stage, including: a grid controlled input tube; means connected to said input tube and responsive to a control voltage to condition said input tube; means coupled to a grid of said input tube for alternately rendering said tube conductive and non-conductive; a magnetic transducer capable of manifesting information signals read from and to be recorded on a magnetic medium; a grid controlled output tube coupled to said transducer for amplifying information signals read from a recording medium; and, rectifier means connecting said transducer to said input tube, said rectifier means being connected to offer its lower resistance to current flow towards the anode of said input tube whereby information signals to be recorded on the magnetic medium are manifested in said transducer whenever said input tube is conductive and spurious noise signals are isolated from said output tube and said transducer whenever said input tube is nonconductive.

3. The apparatus of claim 2 wherein the anode of said input tube, said rectifier means, and said magnetic transducer are connected in series.

4. In a magnetic recording system: recording amplifier means including first and second input terminals respectively coupled to a first and second write triode, a control means including a third triode for rendering said first and second triode non-conductive during predetermined time intervals, the cathode of said third triode being coupled to the cathodes of said first and second triodes, read amplifier means including first and second output terminals respectively coupled to first and second read triodes, a magnetic read-write head, first means including a capacitor coupling said first read triode to said read-write head, second means including a capactor coupling said second read triode to said read-write head, a first diode rectifier having its cathode connected to the anode of said first write triode and the anode of said diode connected to said read-write head and to said first means, a second diode rectifier having its cathode connected to the anode of said second write triode and the anode of said diode connected to said read-write head and to said second means, whereby spurious signals manifested at the anodes of said write triodes are dissipated by said rectifiers and thus isolated from said read triodes whenever said third triode renders said first and second write triodes non-conductive.

5. In a magnetic recording system, the combination of a write amplifier, a read amplifier, a magnetic read-write head coupled to said read amplifier, means for selectively rendering said write amplifier inoperative, unilaterally conductive means connecting the output of said write amplifier with said read-write head and said read amplifier and oriented so as to conduct current in the same direction as said write amplifier, and means for reverse biasing said unilaterally conductive means so as to be non-conductive when said write amplifier is rendered inoperative thereby selectively isolating said write amplifier from said read amplifier and said read-write head.

6. In a magnetic read-write circuit, the combination of a write amplifier comprising a triode, a read amplifier, an electromagnetic read-write transducer coupled to said read amplifier, means having a unilateral conductivity connecting the anode of said triode to said read amplifier and said transducer, said unilateral means being oriented so as to present its highest conductivity to current flowing to the anode of said triode, and reverse biasing means for rendering said unilateral means non-conductive in the absence of current flow through said triode, thereby isolating said anode from said transducer and said read amplifier.

References Cited in the file of this patent

UNITED STATES PATENTS

| | | |
|---|---|---|
| 2,700,148 | McGuigan | Jan. 18, 1955 |
| 2,734,186 | Williams | Feb. 7, 1956 |
| 2,742,634 | Bergen | Apr. 17, 1956 |

OTHER REFERENCES

"Combined Reading and Writing on a Magnetic Drum" (McGuigan B), Proceedings of the I.R.E., October 1953, pp. 1438 to 1444.